United States Patent [19]

Suzuki et al.

[11] Patent Number: 4,548,880
[45] Date of Patent: Oct. 22, 1985

[54] FLAT CELL

[75] Inventors: Shintaro Suzuki, Ebina; Hirotsugu Fujita, Yono; Yoshiaki Asami; Fumiko Homma, both of Tokyo, all of Japan

[73] Assignee: Toshiba Battery Co., Ltd., Tokyo, Japan

[21] Appl. No.: 692,186

[22] Filed: Jan. 17, 1985

[30] Foreign Application Priority Data

Jan. 18, 1984 [JP] Japan ................................. 59-6934

[51] Int. Cl.$^4$ ............................................. H01M 6/12
[52] U.S. Cl. ................................. 429/162; 429/174; 429/185; 429/194
[58] Field of Search ............... 429/152, 162, 194, 196, 429/174, 185

[56] References Cited

U.S. PATENT DOCUMENTS

| | | | |
|---|---|---|---|
| 4,150,200 | 4/1979 | Sullivan | 429/152 |
| 4,256,815 | 3/1981 | Smilanich et al. | 429/174 X |
| 4,389,470 | 6/1983 | Plosse | 429/152 |

Primary Examiner—Charles F. LeFevour
Attorney, Agent, or Firm—Schwartz, Jeffery, Schwaab, Mack, Blumenthal & Evans

[57] ABSTRACT

Disclosed is a flat cell comprising a positive electrode metal plate, a negative electrode metal plate confronted with said positive electrode metal plate, and an adhesive sealing member for sealing the peripheral edge portions of said metal plates, characterized in that said sealing member has a three-layer structure in which ionomer resin pieces are disposed on the opposite sides of a polyethylene piece or an ethylene copolymer piece.

3 Claims, 3 Drawing Figures

FLAT CELL

BACKGROUND OF THE INVENTION

This invention relates to a flat cell, particularly to a sealing member for a flat cell.

In recent years, according to the development of electronics, a variety of appliances such as desk-top calculators and watches has been designed toward miniaturizing and thinning, and also with regard to cells as power sources for driving these appliances, it has been required to miniaturize and thin them more and more.

In a conventional cell, however, a folded portion is provided along the peripheral edge portion of a sealing plate, and crimp sealing is carried out by use of an insulating packing, which fact makes the sealing structure intricate. For this reason, a thickness of the cell has been limited to a level of 1.2 mm, and an ultra-thin cell having a thickness of 1.0 mm or less has not been obtained.

Thus, in order to thin the cell, a new structure has been proposed in which positive and negative electrode metal plates are confronted with each other and peripheral edge portions of these plates are adhesively sealed with an adhesive sealing member, as disclosed in Japanese Unexamined Patent Publication No. 133771/1980. In this structure, the metal plates also serve as an external terminal and an internal current collector. In this suggested publication, an ionomer resin piece having strong adhesiveness to the metal plates is used as the adhesive sealing member.

The flat cell in which the ionomer resin piece is employed as the adhesive sealing member is excellent in airtight seal, and thus such a cell scarcely allows an inside electrolyte to leak therefrom during a long-term storage. For this reason, the flat cell is expected as a power source having a high reliability in point of the prolonged storage stability.

However, since containing a metallic ion, the ionomer resin piece is not good in electrical insulating properties, so that a minute electric current flows through the ionomer resin piece, i.e. a self-discharge occurs, which fact will impair the reliability of its long-term storage.

SUMMARY OF THE INVENTION

Accordingly, an object of this invention is to provide a cell having the higher reliability of a long-term storage by improving the structure of a sealing member of the cell.

According to this invention, there is provided a flat cell comprising a positive electrode metal plate, a negative electrode metal plate confronted with the positive electrode metal plate, and an adhesive sealing member for sealing the peripheral edge portions of the metal plates, characterized in that the sealing member has a three-layer structure in which ionomer resin pieces are disposed on the opposite sides of a polyethylene piece or an ethylene copolymer piece.

DESCRIPTION OF THE PREFERRED EMBODIMENT

Figure 2:
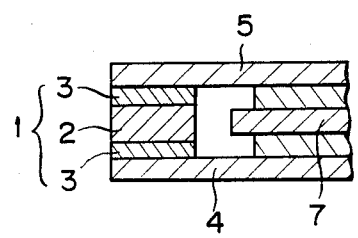
FIG. 2 is an enlarged sectional view of a sealed member of the cell according this invention.

FIG. 2 is an enlarged view of the sealing portion of the cell according to this invention. In FIG. 2, a sealing member 1 has a three-layer structure in which ionomer resin pieces 3 are disposed on opposite sides of a polyethylene piece or an ethylene copolymer piece 2. Depending upon the shape of the cell which may be circular, rectangular, square, etc., the shape of the sealing member may take the shape of a ring, a rectangular flame, a square flame, etc. Although the ionomer resin piece 3 has an ion conductivity, the polyethylene piece 2 is an electrical insulator which is not-conductive, whereby any electric current does not flow between a positive electrode metal plate 4 and a negative electrode metal plate 5. Therefore, it is sure that the cell of this invention having the sealing member 1 in FIG. 2 possesses the high reliability in a long-term storage.

The above-mentioned ionomer resin is a conventional one and has the following chemical structure:

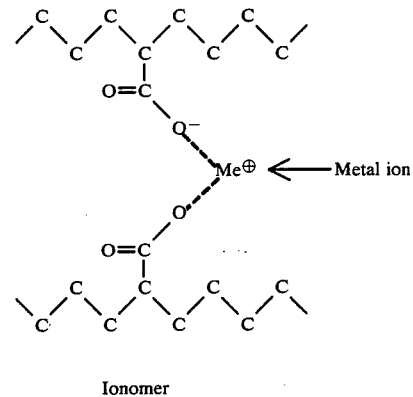

Ionomer

Namely, the ionomers usable in this invention are ionic copolymers prepared by ionic crosslinking of ethyleneacrylic acid copolymers with alkali metals such as magnesium (Mg), alkaline earth metals such as zinc (Zn) or transition metal such as sodium (Na).

Figure 1:
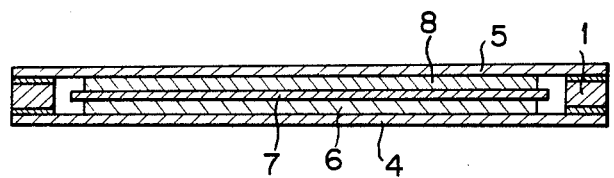
FIG. 1 is a sectional view of a flat cell of this invention.

Now, this invention will be further described in detail with reference to an Example employing a lithium-manganese dioxide non-aqueous electrolyte cell. A structure of this cell is shown in FIG. 1.

On a 20 mm×70 mm positive electrode plate 4 of stainless steel metal, there are disposed a manganese dioxide positive electrode 6 comprising a mixture of manganese dioxide, graphite, polytetrafluoroethylene and polyacrylic acid, a separator 7 containing a non-aqueous electrolyte, a lithium negative electrode 8, a negative electrode plate 5 of stainless steel metal having the same shape as the above-mentioned positive electrode plate 4. The peripheral edge portion of the positive and negative electrodes 4 and 5 are then sealed with the sealing member 1 having the three-layer structure comprising the ionomer resin piece 3 (made of HIMIRAN 1652, available from Mitsui Polychemical Co., Ltd.), the polyethylene piece 2 (made of Low density polyethylene, available from Mitsui Toatsu K.K.) and the other ionomer resin piece 3 (ditto) in order to construct the ultra-thin and sealed flat cell (A) having a thickness of 0.7 mm, which is in accordance with this invention. The ionomer resin piece 3, the polyethylene piece 2 and the other ionomer resin 3 may have thickness ranging from 0.02 to 0.05 mm, 0.10 to 0.30 mm and 0.02 to 0.05 mm, respectively, preferably about 0.04 mm, about 0.20 mm and about 0.04 mm, respectively.

Figure 3:
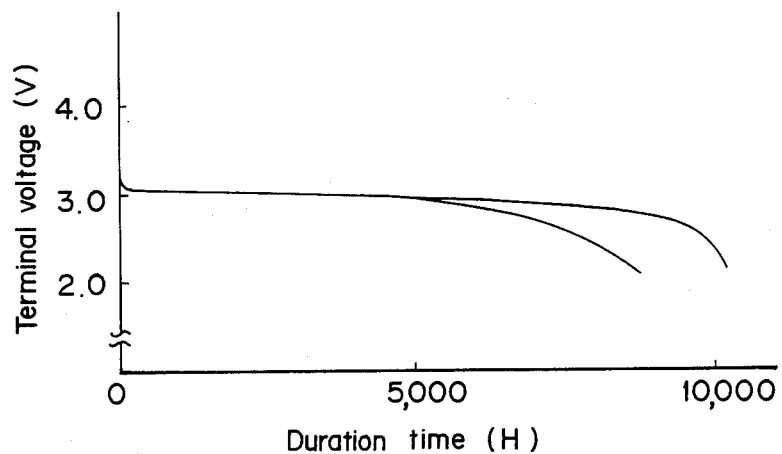
FIG. 3 shows discharge curves comparing the cell (A) of this invention with a conventional cell (B).

For comparison, a cell (B) having a similar shape was constructed by using a sealing member comprising the ionomer resin piece alone instead of the above-mentioned sealing member having the three-layer structure. FIG. 3 shows discharge curves of the cells (A) and (B) which were measured by leaving them to stand for a long period of time. The discharge in this case was carried out at a temperature of 20° C. and a constant resistance of 2 MΩ. As is apparent from the results of these curves, the cell (A) of this invention has a more prolonged duration time than the comparative cell (B), and it can be understood that the cell of this invention is excellent in the long-term storage reliability. Such a shortened duration time of the comparative cell would be attributable to the fact that a small electric current flowed through the ionomer resin piece which was the sealing member, i.e. the fact that self-discharge occurred. On the contrary, the cell (A) of this invention made use of the sealing member of the three-layer structure in which the electrical insulating polyethylene piece was interposed between the ionomer resin pieces, and therefore the self-discharge was scarcely brought about, so that the long duration time was obtained. Further, also when an electrical insulating ethylene copolymer piece was employed in place of the polyethylene piece, a similar result was obtained.

As mentioned in detail above, this invention can provide the ultra-thin flat cell excellent in the reliability of the long-term storage.

We claim:

1. A flat cell electrical power source comprising a non aqueous electrolye, a positive electrode metal plate, a negative electrode metal plate confronted with said positive electrode metal plate, and an adhesive sealing member for sealing the peripheral edge portions of said metal plates, characterized in that said sealing member has a three-layer structure in which ionomer resin pieces are disposed on the opposite sides of a polyethylene piece or an ethylene copolymer piece.

2. The flat cell according to claim 1, wherein said ionomer resin pieces each have thickness of 0.02 to 0.05 mm and said polyethylene piece, of 0.10 to 0.30 mm.

3. The flat cell according to claim 1, wherein said ionomer resin pieces are disposed on the opposite sides of the polyethylene piece.

* * * * *